(12) United States Patent
Jourdan et al.

(10) Patent No.: US 6,553,483 B1
(45) Date of Patent: Apr. 22, 2003

(54) ENHANCED VIRTUAL RENAMING SCHEME AND DEADLOCK PREVENTION THEREFOR

(75) Inventors: Stephan J. Jourdan, Portland, OR (US); Ronny Ronen, Haifa (IL); Michael Bekerman, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/449,520

(22) Filed: Nov. 29, 1999

(51) Int. Cl.[7] .......................... G06F 9/38; G06F 9/345; G06F 12/08

(52) U.S. Cl. .................. 712/217; 712/237; 711/211; 711/213; 711/144; 711/204

(58) Field of Search .................. 712/207, 239, 712/237, 238, 245, 219, 217, 240, 227, 201, 202, 23, 228, 26, 212; 711/123, 125, 144, 211, 213, 204

(56) References Cited

U.S. PATENT DOCUMENTS

| | | | | |
|---|---|---|---|---|
| 5,535,346 A | * | 7/1996 | Thomas, Jr. | 712/217 |
| 5,546,593 A | * | 8/1996 | Kimura et al. | 712/228 |
| 5,692,168 A | * | 11/1997 | McMahan | 712/237 |
| 5,828,860 A | * | 10/1998 | Miyaoku et al. | 712/207 |
| 6,298,435 B1 | * | 10/2001 | Chan et al. | 712/217 |

OTHER PUBLICATIONS

Gonzalez et al, "Virtual–Physical Registers", 1998 Fourth International Symposium on High–Performance Computer Architecture, Las Vegas, Nevada, Feb. 1–4, 1998, IEEE Computer Society, Los Alamitos, California.

Gonzalez et al, "Virtual Registers", Fourth International Conference on High–Performance Computing, Dec. 18–21, 1997, Bangalore, India, IEEE Computer Society, Los Alamitos, California.

Anderson et al, "The IBM System/360 Model 91:Machine Philosophy and Instruction–Handling", *IBM Journal of Research and Development*, vol. 11, No. 1, Jan. 1967, pp. 8–24.

Butler et al, "An Area–Efficient Register Alias Table for Implementing HPS", Proceedings of the 1990 Int'l. Conference on Parallel Processing, vol. 1 Architecture, Aug. 13–17, 1990, Pennsulvania State University Press, University Park, PA, pp. I–611 to I–612.

(List continued on next page.)

*Primary Examiner*—Daniel H. Pan
(74) *Attorney, Agent, or Firm*—Kenyon & Kenyon (57) ABSTRACT

In an enhanced virtual renaming scheme within a processor, multiple logical registers may be mapped to a single physical register. A value cache determines whether a new value generated pursuant to program instructions matches values associated with previously executed instructions. If so, the logical register associated with the newly executed instruction shares the physical register. Also, deadlock preventatives measures may be integrated into a register allocation unit in a manner that "steals" a physical register from a younger executed instruction when a value from an older instruction is generated in a processor core.

23 Claims, 4 Drawing Sheets

OTHER PUBLICATIONS

Butler et al, "A Comparative Performance Evaluation of Various State Maintenance Mechanisms", Proceedings of the 26th Annual Int'l. Symposium on Microarchitecture, Dec. 1–3, 1993, Austin, TX, pp. 70–79.

Chrysos et al, "Memory Dependence Prediction Using Store Sets", Proceedings of the 25th Annual Int'l. Symposium on Computer Architecture, Jun. 27–Jul. 1, 1998, Barcelona, Spain, pp. 142–153.

Farkas et al, "Register File Design Considerations in Dynamically Scheduled Processors", *WRL Research Report 95/10*, Nov. , 1995, Palo Alto, CA.

Franklin et al, "ARB: A Hardware Mechanism for Dynamic Reordering of Memory References", *IEEE Transactions on Computers*, vol. 45, No. 5, May, 1996, pp. 552–571.

Gallagher et al, "Dynamic Memory Disambiguation using the Memory Conflict Buffer", Proceedings of the 6th Int'l. Conference on Architectural Support for Programming Languages and Operating Sytems, Oct. 4–7, 1994, San Jose, CA, pp. 183–193.

Keller, Robert, "Look–Ahead Processors", *Computing Surveys*, vol. 7, No. 4, Dec. 1975, New York, NY, pp. 177–195.

Hwu et al, "Checkpoint Repair for High–Performance Out–of–Order Machines", vol. C–36, No. 12, Dec. 1987, New York, NY, pages 177–195.

*Pentium® Prop Family Developer's Manual*, vol. 2: Programmer's Referance Manual, Jan. 1996, Chapters 1 and 2.

Johnson, Mike, *Superscalar Microprocessor Design*, 1991, Chapters 10 and 11, Englewood Cliffs, NJ.

Lipasti et al, "Exceeding the Dataflow Limit Via Value Prediction", Proceedings of the 29th Annual IEEE/ACM Int'l. Symposium on Microarchitecture, Dec. 2–4, 1996, pp. 226–237.

Martin et al, "Exploiting Dead Value Information", Proceedings of the 30th Annual IEEE/ACM Int'l. Symposium on Microarchitecture, Dec. 1–3, Moshovos et al, "Dynamic Speculation and Synchronization of Data Dependence", Proceedings of the 24th Annual Int'l. Symposium on Computer Architecture, Jun. 2–4, 1997, Denver, CO, pp. 181–193.

Moshovos et al, "Streamlining Inter–Operation Memory Communication Via Data Dependence Prediction", Proceedings of the 30 Annual IEEE/ACM Int'l. Symposium on Microarchitecture, Dec. 1–3, 1997, Research Triangle park, NC, pp. 235–245.

Moudgill et la, "Register Renaming and Dynamic Speculation: An Alternative Approach", Proceedings of the 26th Annual Int'l. Symposium on Microarchitecture, Dec. 1–3, 1993, Austin, TX, pp. 202–213.

Patt et al, "HPS, A New Microarchitecture: Rationale and Introduction", Proceedings of the 18th Annual Workshop on Microprogramming, Pacific Grove, CA, vol. 16, No. 4, Dec. 3–6, 1985, pp. 103–108.

Smith et al, "Implementation of Precise Interrupts in Piplined Processors", Proceedings of the 12th Annual Int'l. Symposium on Computer Architecture, Jun. 17–19, 1985, Boston, MA, pp. 36–44.

Smith et al, "The Microarchitecure of Superscalar Processors", *Proceedings of the IEEE*, Dec. 1995, pp. 1609–1624.

Sodami et al., "Dynamic Instruction Reuse", Conference Proceedings of the 24th Annual Int'l. Symposium on Computer Architecture, Jun. 2–4, 1997, Denver, CO, pp. 194–205.

Tjaden et al, "Detection and Parallel Execution of Independent Instructions", *IEEE Transactions on Computers*, vol. C–19, No. 10, Oct. 1970, pp. 889–895.

Tyson et al, "Improving the Accuracy and Performance of Memory Communication Through Renaming", Proceedings of the 30th Annual IEEE/ACM Int'l. Symposium on Microarchitecture, Dec. 1–3, 1997, Research Triangle Park, NC, pp. 218–227.

Weiss et al, "Instruction Issue Logic in Pipelined Supercomputers", vol. C–33 No. 11, Nov. 1984, pp. 1013–1022.

Jourdan et al, "A Novel Renaming Scheme to Exploit Value Temporal Locality through Physical Register Reuse and Unification", Proceedings 31st Annual ACM/IEEE Int'l Symposium on Microarchitecture, Nov. 30–Dec. 2, 1998, Dallas, TX, pp. 216–225.

\* cited by examiner

ENHANCED VIRTUAL RENAMING SCHEME AND DEADLOCK PREVENTION THEREFOR

BACKGROUND OF THE INVENTION

For modern processors there is a difference between logical registers and physical registers that actually store the data. Logical registers are labels defined by the instruction set architecture. These labels do not address specific hardware within a processor. Indeed, a logical register label may refer to a first register for a first instruction in a program and may refer to an entirely different register for another instruction. Physical registers are storage units within a processor core. Logical registers are mapped to physical registers. The mapping changes over time. Typically, the identity and use of physical registers cannot be determined by a processor's instruction set architecture.

For example, the instruction "MOV EAX, 0" (Store the value 0 in register EAX) does not refer to a physical register location in a processor. Instead, it refers to a "logical register," a fictional register that may be mapped to various physical registers within a processor as the processor advances through executable program instructions. This property of modern processors is a well-known byproduct of out-of-order processing.

The inventors of the present invention noted that the values stored in physical registers often exhibit a high degree of redundancy. For example, consider an example where three variables are initialized to zero in a processor core. In traditional processors, the three variables each would occupy different physical registers. This is inefficient because, so long as the values are the same, the contents of the three variables could be stored in a single physical register. The other two registers could be used for other purposes. U.S. patent application Ser. No. 08/348,403, entitled "Unified Renaming Scheme," filed Jul. 7, 1999, discloses a register renaming scheme that maps multiple logical registers to a single physical register.

A virtual naming scheme (sometimes referred to as "late binding") has recently been proposed for physical registers. See, Gonzalez, et al., "Virtual Physical Registers," Proc. 4th Int'l Symp. High Perf. Computer Architecture (February 1998). Under the virtual renaming scheme, physical registers are allocated for data generated during instruction execution after the data is generated. In traditional processors, physical locations had been allocated to instructions much earlier, when the instructions were loaded in the processor core. Because the virtual renaming techniques shorten the amount of time that a physical register is allocated to a particular instruction, Gonzalez's techniques permit a fixed number of physical registers to support a greater number of instructions than could have been supported when registers were allocated upon receipt of an instruction.

Accordingly, there is a need in the art for a virtual register renaming scheme that permits multiple logical registers that have the same value to map to a single physical register wherein that value is stored.

SUMMARY

Embodiments of the present invention provide a register allocation unit that, when results of a newly executed instruction are generated, determines whether the results match the value of previously stored data. When there is a match, the results are assigned to the memory location where the matching data is stored.

DETAILED DESCRIPTION

An embodiment of the present invention introduces an enhanced virtual renaming scheme for use in processing systems. This enhanced virtual renaming scheme combines the benefits of the inventors' multiple mapping scheme with late binding. It permits multiple logical registers to be mapped to a single physical register and also permits the mapping to be made after instruction execution. The invention also guarantees that this mapping will be made in a safe manner. Thus, in the example above, where three logical registers each have the same value, the three logical registers may be mapped to a single physical register. The enhanced virtual renaming scheme permits a single physical register to support multiple logical registers and, thus, extends the reach of the physical registers in a processor core. According to an embodiment, value matching is performed upon the result of a newly executed instruction to determine whether the same result is stored already in some register. If so, the instruction result is mapped to the physical register.

Figure 1:
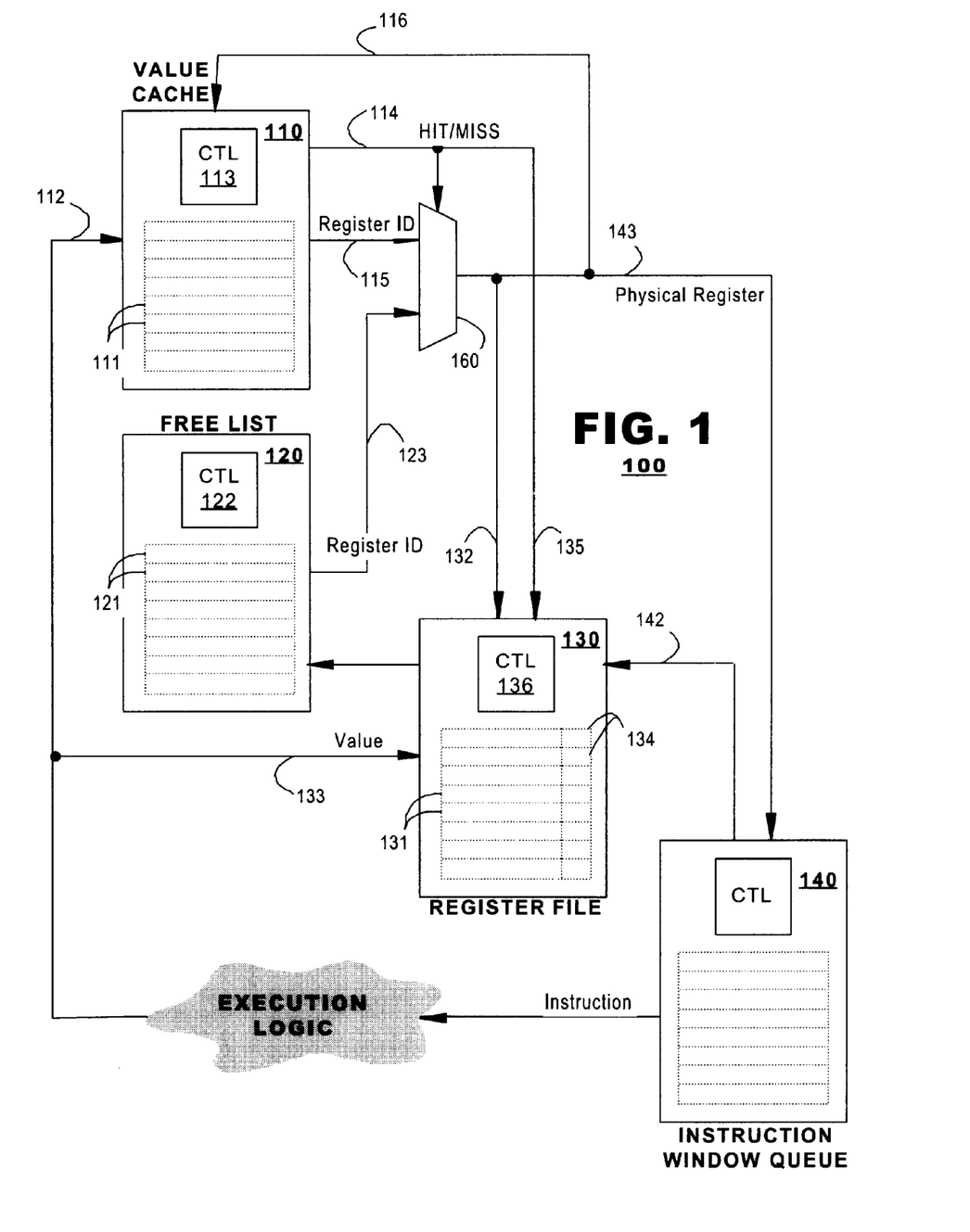
FIG. 1 is a block diagram of a register allocation unit according to an embodiment of the present invention.

FIG. 1 is a block diagram of a register allocation unit 100 according to an embodiment of the present invention. The register allocation unit 100 may include a value cache 110, a free list 120, a register file 130 and an instruction window queue 140. The register file 130 may store data in physical registers 131. Each physical register 131 may be addressed by its own register ID. Addressing signals may be input to the register file 130 over address lines 132. Data to be written to the register file 130 may be input to the register file 130 over data lines 133. The register file 130 also may include control logic and additional input control lines (not shown) that control the reading and writing of data to and from the register file 130. In this regard, the structure and operation of the register file 130 is well-known.

Each physical register 131 within the register file 130 may include a counter 134. According to an embodiment, the counter 134 may identify a number of logical registers that are mapped to the physical register 131. Thus, in the example provided above, where three variables each may be initialized to zero concurrently, the counter 134 would indicate that at least three logical registers are mapped to the physical register 131.

The register file 130 may include another input 135 to receive a HIT/MISS signal from the value cache 110. The register file 130 also may include a controller 136 to increment or decrement the counter values during register allocation.

The instruction window queue 140 maintains information regarding the status of all active instructions in the processor core. Instructions may be considered active from the time that they are loaded into the processor core to the time they are retired from the core. As discussed, although the processor core may execute instructions out of order, instructions typically retire in order. A full understanding of the instruction window queue is not necessary for the purposes of this discussion. For this discussion, it is sufficient to note that the instruction window queue 140 may output instructions to execution logic within the processor core. In so doing, the instruction window queue 140 may output information regarding the logical registers to which each instruction refers. Such properties of the instruction window queue 140 are well-known.

The instruction window queue 140 may include control logic 141 that maintains status information regarding the active instructions. When an instruction retires, the control logic 141 may output physical register identifiers that are associated with the retired instruction on an output 142. According to an embodiment of the present invention, when an instruction retires, the instruction window queue 140 identifies the physical register ID of a physical register that had been previously mapped to the destination logical register of the retiring instruction. The instruction window queue 140 may output this physical register ID to the register file 130.

The instruction window queue 140 may monitor dependencies among the stored instructions. For example, it may determine that result data from a first instruction may become source data of a second instruction. When a new instruction is stored in the instruction window queue 140, control logic 141 may identify other instructions on which new instruction depends. The instruction window queue 140 may identify any physical registers that may constitute source data for the new instruction and may create an association between the new instruction and source register in the queue 140. For this purpose, the instruction window queue 140 may receive register IDs of newly allocated physical registers via line 143.

According to an embodiment of the present invention, the register allocation unit 100 may include a value cache 110. The value cache 110 may be populated by a plurality of cache entries 111 that maintain information about which physical registers 131 store which values. Thus, each cache entry 111 may associate a physical register ID with a value. The value portion of each cache entry 111 may include content addressing logic to permit a comparison of an externally supplied value provided on an input 112 with the values stored in each entry 111 of the value cache 110.

The value cache 110 may include a controller 113 that generates a HIT/MISS signal on an output 114 indicating whether an input value matches a value stored in the cache entries 111. When an input value hits one of the cache entries 111, the controller 113 may cause the register ID stored in the cache entry 111 to be output from the value cache on a second output 115.

The free list 120 may maintain a list of physical registers that are available for allocation and also indicate whether any physical registers are available. The free list 120 may be populated by a plurality of list entries 121 and may include a free list controller 122. The free list controller 122 may cause a register ID of an available physical register to be output on line 123. The free list 120 may receive a HIT/MISS signal input over line 124. If the HIT/MISS signal indicates a miss, the free list 120 may remove a register from the list—the register will be allocated to the newly received value.

The register allocation unit 100 also may include a multiplexer ("MUX") 160 having inputs coupled to the value cache 110 and the free list 120 respectively. The MUX 160 may be controlled by the HIT/MISS signal from the value cache 110. Thus, in response to the HIT/MISS signal, the MUX 160 outputs a register ID from either the value cache 110 or the free list 120. The output from the MUX 160 may be input to the register file 130 and to the instruction window queue 140.

The value cache 110 also may receive the physical register ID output from the MUX 160 on an input line 116. This permits the value cache 110 to create associations between new values (those that miss the value cache) and the register IDs to which they are assigned.

During operation, instruction execution may cause a new value to be input to the register allocation unit 100. The value may be input to the value cache 110 and to the register file 130. The value cache 110 determines whether the new value matches a value already stored in the register file 130. If so, it outputs the register ID stored in the matching cache entry 111 and causes the MUX 160 to output this register ID to the register file 130 and to the instruction window queue 140.

The register file 130 receives the HIT signal with the register ID and the value data. In response to the HIT signal, the controller 136 may increment the counter 134 in the physical register 131 being addressed. In an embodiment, the register file 130 also may cause the value input on line 133 to be stored in the physical register 131 being addressed. But, because this step is redundant (the physical register 131 already stores the value), other embodiments permit the storage step to be omitted.

If the new value misses the value cache, then the HIT/MISS signal causes a register ID from the free list 120 to be output from the MUX 160. When the register ID is input to the register file 130, the value input on line 133 is stored in the physical register 131 addressed by the register ID. The register file controller 136 may cause the counter of the new physical register to be incremented.

Each time the MUX 160 generates a new output, the register file 130 increments a counter in the register identified by the MUX 160. This occurs regardless of which input, the physical register ID from the value cache 110 or from the free list 120, is output by the MUX 160.

In an alternate embodiment, line 123 from the free list 120 may be input to the register file 130 directly, bypassing the MUX 160. This input may be used to address physical registers in the register file 130 and permits the register file 130 to store input values on the clock cycle when it is received. Although the value is written to the register file 130, it may not be used if the value cache 110 determines that the value is stored already in another register. Thus, the hit/miss signal and physical register ID output from the MUX 160 identifies a register to which the value ultimately will be mapped. The register file 130 may use these inputs to increment a counter in the register identified by the MUX 160.

Table 1 below provides an example of this process given specific instructions. Consider the example provided above where three variables are initialized to zero and then incremented. To better present the example, Table 1 illustrates only two variables, EAX and EBX that are initialized to zero then incremented.

TABLE 1

| Inst. No. | Instruction | Value of Logical Register EAX | EAX Mapping | Value of Logical Register EBX | EBX Mapping | Counter of Physical Register 39 | Counter of Physical Register 13 |
|---|---|---|---|---|---|---|---|
| 1 | 0 → EAX | 0 | PR 39 | — | — | 1 | 0 |
| 2 | 0 → EBX | 0 | PR 39 | 0 | PR 39 | 2 | 0 |
| 3 | Inc. EAX | 1 | PR 13 | 0 | PR 39 | 2 | 1 |
| 4 | Inc. EBX | 1 | PR 13 | 1 | PR 13 | 2 | 2 |
| | Instruction No. 1 Retires | | | | | 2 | 2 |
| | Instruction No. 2 Retires | | | | | 2 | 2 |
| | Instruction No. 3 Retires | | | | | 1 | 2 |
| | Instruction No. 4 Retires | | | | | 0 | 2 |

A first instruction causes the value zero to be stored in a logical register EAX. Assuming that this instruction is the first to cause the value zero to be stored anywhere within the register file 130, the value zero will miss the value cache 110 and may cause the value to be stored in a new physical register (say, physical register 39) identified by the free list 120. The counter associated with physical register 39 will be incremented. The value cache 110 will store a new association between the value zero and physical register 39. The instruction window queue 140 may distribute the register ID of physical register 39 to other instructions that depend upon instruction no. 1, such as instruction no. 3.

When instruction no. 2 is performed, the value zero will hit the value cache 110 and may cause physical register 39 to be identified to the MUX 160. The register file 130 will increment the counter at physical register 39. The instruction window queue 140 may distribute the register ID of physical register 39 to other instructions that depend upon instruction no. 2, such as instruction no. 4.

When instruction no. 3 is performed, EAX will have a value 1. This value may miss the value cache 110, which would cause a new physical register (say, physical register 13) to be allocated. The value 1 would be stored in the new physical register. The value cache 110 would create a new association between the value 1 and physical register 13. Further, the instruction window queue 140 may distribute the register ID of physical register 13 to other instructions that depend upon instruction no. 3 (not shown).

When instruction no. 4 is performed, EBX will have a value 1. This value may hit the value cache 110 and causes physical register 13 to be identified to the MUX 160. The register file 130 may increment the counter at physical register 13. Further, the instruction window queue 140 may distribute the register ID of physical register 13 to other instructions that depend upon instruction no. 4 (not shown).

Note that, although the incrementing instructions may cause the logical registers EAX and EBX to be reallocated from physical register 39 to physical register 13, this does not cause the counter in physical register 39 to be decremented. As discussed, the embodiments of the present invention may be applied to processing cores that perform out-of-order processing. In such systems, the counters 134 of physical registers may be deallocated only upon instruction retirement.

The counter 134 of a physical register may be decremented upon the retirement of an instruction that modifies one of the logical registers that was mapped previously to the physical register. Consider the example shown in Table 1. Instruction no. 1 sets EAX to zero. Instruction no. 3 increments EAX to one. The counter associated with register 39 (the version of EAX upon execution of instruction no. 1) may be decremented upon the retirement of instruction no. 3. This is appropriate because, when instruction no. 3 retires, it can be guaranteed that no other instruction will attempt to refer to the EAX register generated by instruction no. 1 that resided in physical register 39.

When an instruction is retired, the instruction window queue 140 may communicate with the physical register file 130 identifying that an instruction has retired and providing physical register IDs of registers that were source data for the retired instruction. In response to this communication, the register file controller 136 causes the counter 134 in the physical register 131 to be decremented. The controller 136 also tests the value of the counter 134 and, if the value is zero, identifies the physical register to the free list 120. The free list 120 records the physical register ID and the physical register becomes available for allocation.

Thus, in the example provided in Table 1, the counter associated with physical register 39 is decremented when instructions 3 and 4 retire. When the counter becomes zero, physical register 39 may be returned to the free list 220 for re-allocation.

Accordingly, embodiments of the present invention provide an enhanced virtual renaming system that permits physical register reuse based upon redundancies of stored data.

Figure 2:
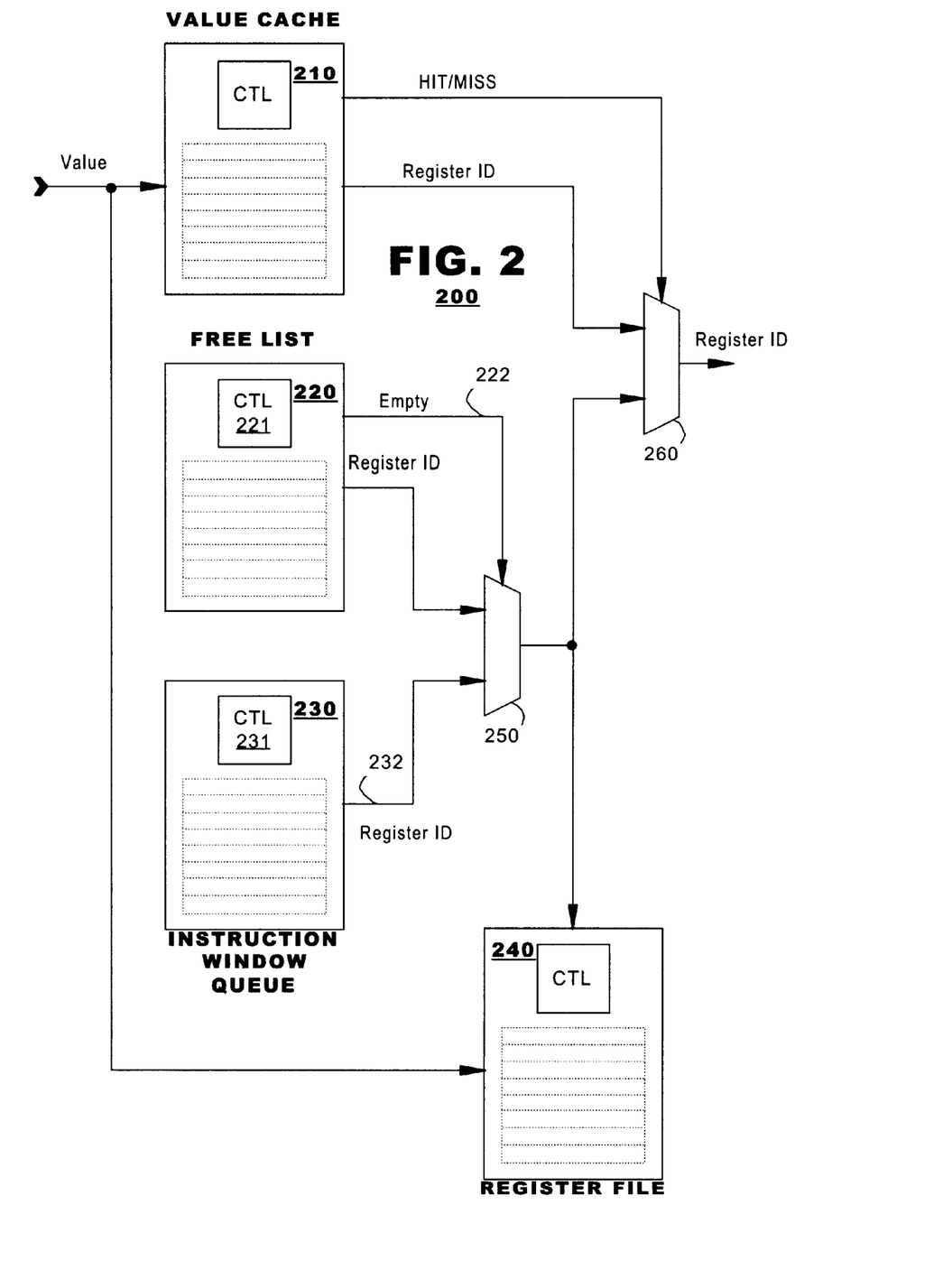
FIG. 2 is a block diagram of register allocation unit according to another embodiment of the present invention.
Figure 3:
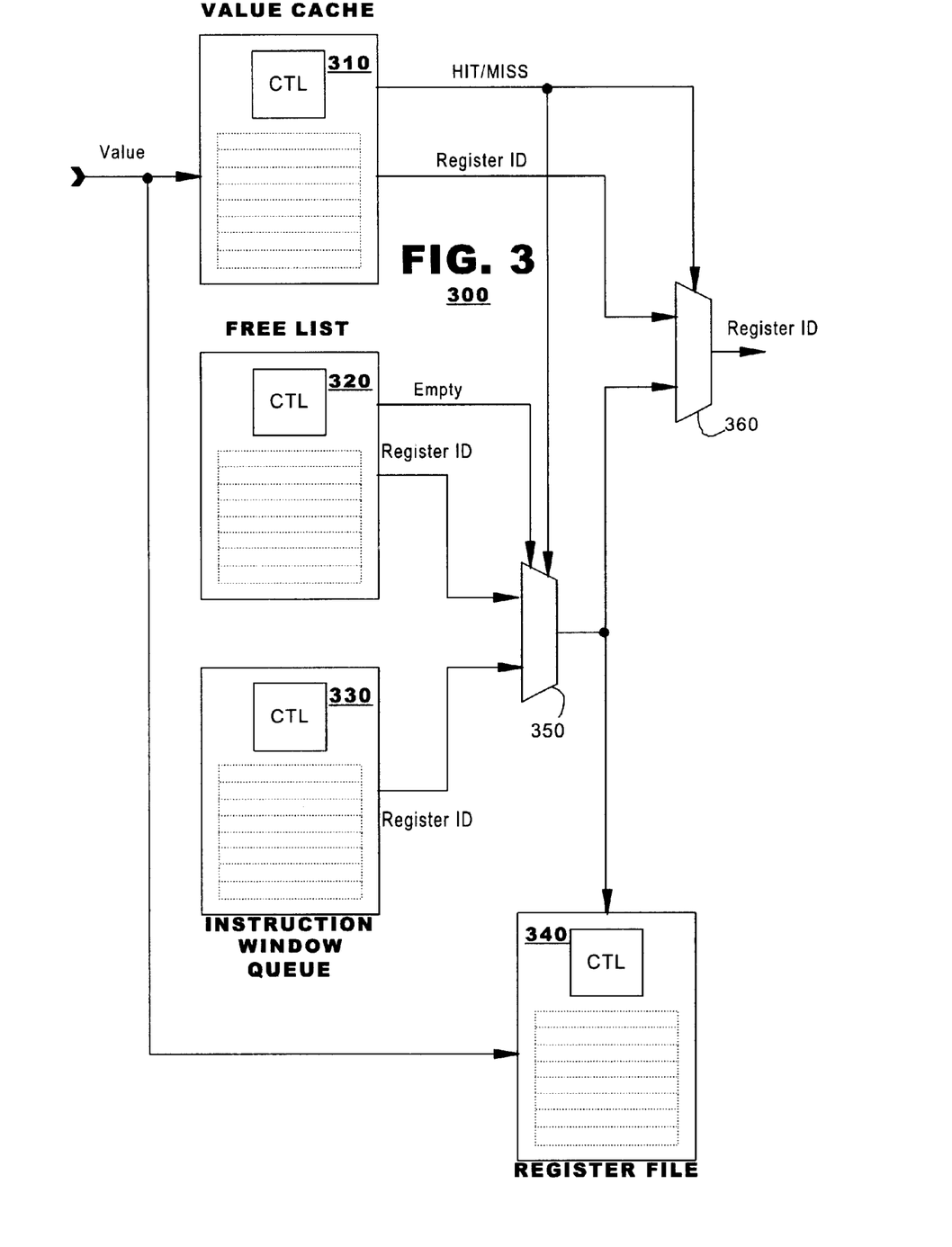
FIG. 3 is a block diagram of register allocation unit according to a further embodiment of the present invention.
Figure 4:
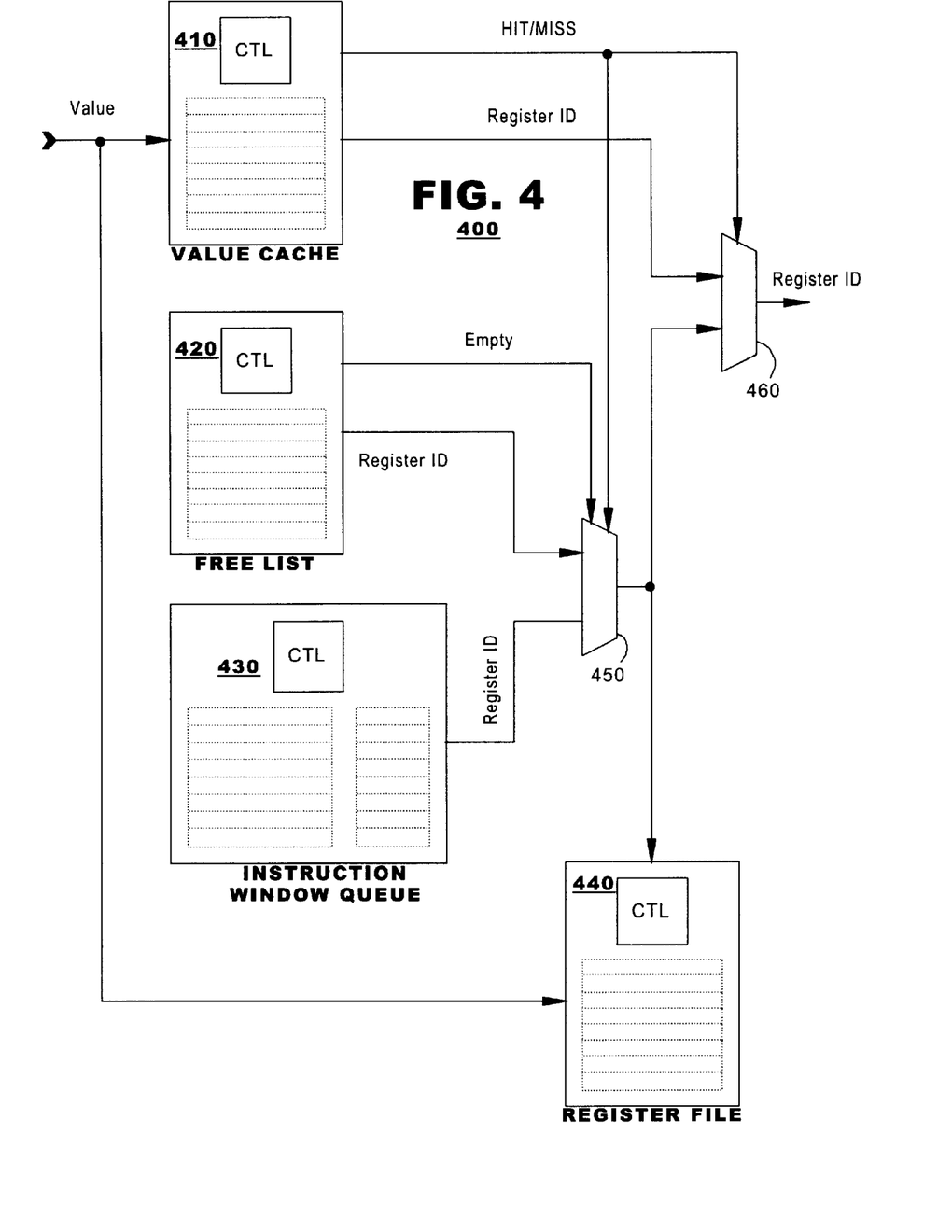
FIG. 4 is a block diagram of register allocation unit according to a further embodiment of the present invention.

FIGS. 2–4 discuss deadlock preventative measures that may be appropriate for use with different implementations of a register allocation unit. One form of deadlock may occur when all physical registers are allocated for executed instructions and an oldest instruction in the instruction window queue has not been executed. If all physical registers are allocated, there will be no register available to store the result of the oldest instruction until a register becomes deallocated. However, instructions retire in order and physical registers will not be deallocated until the oldest instruction retires. Deadlock occurs.

In general, the deadlock solutions presented in the subsequent embodiments "steal" the register of some younger instruction. As a consequence of this "theft," the younger instruction and all instructions that share this physical register would have to be re-executed. However, out-of-order processors routinely re-execute instructions for a variety of reasons. This consequence is believed to have a minimal performance impact. The following embodiments depict several variations of deadlock prevention mechanism.

FIG. 2 is a block diagram of a register allocation unit 200 according to an embodiment of the present invention. The register allocation unit 200 may include a value cache 210, a free list 220, an instruction window 230 and a register file 240 that operate similarly to those embodiments already discussed. FIG. 2 illustrates only those elements that contribute to this embodiment of the deadlock solution. Other elements of a register allocation unit have been omitted from FIG. 2 in an effort to keep the presentation of the deadlock solution as simple as possible.

As in the other embodiments discussed herein, the register file 240 may store data in physical registers 241 that are addressed by register IDs. Data may be written into and read out of the register file according to the techniques described elsewhere.

The value cache 210 generates HIT/MISS indicators in response to a comparison of a new value against values already stored in the value cache 210. When a new value hits the value cache 210, the value cache 210 may generate a hit signal output the register ID associated with the stored value that causes the hit.

The free list 220 maintains a list of physical registers that are available for allocation to new values. The free list 220 also may include a free list controller 221 that determines when the free list 220 is empty—there are no physical registers available for allocation. The free list controller 221 may generate an empty indicator signal on an output 222.

The instruction window queue 230 maintains status information regarding each of the non-retired instructions loaded in the processor core. The instruction window queue 230 may include a queue controller 231 that can identify the youngest executed instruction stored in the instruction window queue 230 and may cause the register ID associated with the result of the youngest executed instruction to be output on a line 232.

The register allocation unit 200 of FIG. 2 may include a pair of MUXes 250, 260. A first MUX 250 receives the register IDs output from the free list 220 and from the instruction window queue 230. The first MUX 250 may be controlled by the empty indicator signal from the free list 220. Thus, when the empty indicator signal identifies that there are physical registers available for allocation, the first MUX 250 outputs a register ID from the free list 220. Otherwise, when the empty indicator signal identifies that there are no physical registers available for allocation, the MUX 250 outputs the register ID of the youngest executed instruction in the instruction window queue 230. This output from the first MUX 250 may be input to the register file 240 as an address. Thus, the new value may be stored in the physical register identified by register ID from the first MUX 250.

The second MUX 260 may receive register IDs output from the value cache 210 and from the first MUX 250. The second MUX 260 may be controlled by the HIT/MISS signal from the value cache 210. Thus, when the HIT/MISS signal indicates a hit, the second MUX 260 outputs the register ID from the value cache 210. When the HIT/MISS signal indicates a miss, the second MUX 260 outputs the register ID output from the first MUX 250. Thus, the second MUX 260 identifies which of the physical registers stores the value input to the register allocation unit 200.

An embodiment of FIG. 2 may cause data to be written in the register file 130 regardless of the hit/miss decision made by the value cache. In the embodiment shown in FIG. 2, the first MUX 250 is shown controlled solely by the empty indicator signal 222. Thus, when the value is input to the register file 240 and the register ID from the first MUX 250 is input to the register file 240 as an address, the register file 240 will cause the value to be written t o the identified register regardless of whether the value hit the value cache 110. When the free list 220 is empty, this may cause registers to be stolen regardless of whether the value hit the value cache 210. If the value hit the value cache 210, it is possible that a register will be stolen unnecessarily.

FIG. 3 illustrates a register allocation unit 300 according to another embodiment of the present invention. This embodiment includes a value cache 310, a free list 320, an instruction window 330, a register file 340 and a pair of MUXs 350, 360 that operate in manners similar to previous embodiments.

In the embodiment of FIG. 3, the first MUX 350 may be controlled both by the HIT/MISS signal from the value cache 310 and by the empty indicator signal from the free list 320. According to this embodiment, the two control signals for the first MUX 350 permit four combinations. The first MUX 350 may be configured to generate invalid outputs when the HIT/MISS sign al indicates that a value hit the value cache 310 and to gene rate register IDs when the HIT/MISS signal indicates that a value missed the value cache 310. This mode of operation may be summarized in Table 2 below.

TABLE 2

| HIT/MISS Signal from Value Cache | Empty Indicator Signal from Free List | Output of First MUX |
| --- | --- | --- |
| HIT | Empty | Invalid Output |
| HIT | Full | Invalid Output |
| MISS | Empty | Register ID from Instruction Window |
| MISS | Full | Register ID from Free List |

Thus, according to this embodiment, when an input value matches a value stored in the value cache 310, the HIT/MISS signal causes the first MUX 350 to generate an output that represents an invalid address to the register file 340. The address would prevent data from being written into the register cache 340 even in the presence of control signals that otherwise would cause data to be written to the register cache. The embodiment of FIG. 3 avoids the accidental theft that may occur in the embodiment of FIG. 2.

While the embodiment of FIG. 3 avoids the accidental theft characteristic of FIG. 2, the FIG. 2 embodiment still may possess advantages over the FIG. 3 embodiment. The embodiment of FIG. 3 introduces new timing considerations that are not present in the embodiment of FIG. 2. For example, the selection of the first MUX 350 may be made only after the value cache 310 outputs a hit/miss decision. This, in turn, affects the time that a valid register ID becomes available to the register file 340. This timing dependency may cause the register allocation process to become a two-stage process rather than a one-stage process as in the FIG. 2 embodiment. Thus, even though the FIG. 2 embodiment may cause an accidental theft occasionally, it may be preferred over the FIG. 3 embodiment due to its one-stage timing characteristics. Thus, depending upon the timing requirements of a system into which this invention may be integrated, one embodiment may be preferable over the other.

FIG. 4 illustrates a register allocation unit 400 according to yet another embodiment of the present invention. Again, the register allocation unit 400 may be populated by a value cache 410, a free list 420, an instruction window queue 430, a register file 440 and a pair of MUXes 450, 460 that operate in manners similar to that described with respect to the previous embodiments.

In the embodiment of FIG. 4, the instruction window queue 430 may generate an output that represents the youngest allocated register, when considered in program order. This embodiment becomes useful to guard against the event that an oldest instruction and a youngest instruction are mapped to the same physical register in the register file 440. In this case, a register theft could cause the register of the oldest instruction to be stolen and could force the oldest instruction to be re-executed.

As discussed, an internal window queue 430 may store instructions in program order. According to an embodiment, for each physical register identified in the queue, the internal window queue 430 may determine the oldest instruction that refers to the physical register. Based upon this identification, the internal window queue 430 may create a ranking of the physical register IDs in age order of instruction (shown illustratively as 431). The register ID output by the instruction window queue 430 in this embodiment will be different than the register ID of the oldest instruction stored in the queue 430 and from any retired register.

Note that a lack of physical registers, even when it does not cause a deadlock, may be a source of performance degradation. Such an event stalls the machine until previous instructions are retired and registers are deallocated. The "theft" mechanism may be used in such cases as well to improve performance and to avoid a future deadlock in case retired instructions do not free any physical register.

Not every physical register can be "stolen". If a "stolen" register is also mapped by an instruction older than the one initiated the stealing, we may cause another deadlock. In order to prevent such deadlock, the number of physical registers should be greater than the number of logical registers, and the mechanism should allow pipeline stalls until a register is available.

The deadlock preventative measures of the foregoing embodiments find application in conventional register allocation units—those that do not permit logical registers to share physical registers.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A register allocation unit, comprising:
   a value cache having a hit/miss output and a register ID output, comprising:
     an input for a new value signal,
     a plurality of cache entries, each to store values in association with a physical register ID, value portions of the cache entries including content addressable logic, and
     a controller, responsive to a match identified by the content addressable logic, to generate a HIT signal on the hit/miss output; and
   a free list having a register ID output, and
   a selector coupled to the register ID outputs of the value cache and the free list and having a control input coupled to the hit/miss output.

2. A register allocation unit, comprising:
   a value cache having a hit/miss output and a register ID output,
   a free list having a register ID output,
   a selector coupled to the register ID outputs of the value cache and the free list and having a control input coupled to the hit/miss output, and
   a register file having an addressing input coupled to the selector output.

3. The register allocation unit of claim 2, wherein the register file comprises a plurality of registers, each register comprising a first portion to store data and a second portion to store a counter.

4. The register allocation unit of claim 2, wherein the hit/miss output is coupled to the register file.

5. A register allocation unit, comprising:
   a value cache having a hit/miss output and a register ID output,
   a free list having a register ID output,
   a selector coupled to the register ID outputs of the value cache and the free list and having a control input coupled to the hit/miss output, and
   a register file having an addressing input coupled to the free list output.

6. The register allocation unit of claim 5, further comprising a free list, wherein when the count in a physical register is decremented to zero, the register file is to communicate an identifier of the physical register to the free list.

7. A register allocation unit for use in a processor core, comprising:
   a register file, populated by a plurality of physical entries, the physical entries each having a first portion to store data and a second portion to store a count of a number of logical registers that map to the respective physical registers,
   an instruction window queue to store information regarding active instructions, the information including an identifier of physical registers that store results of executed instructions therein,
   wherein, when an instruction is retired from the instruction window queue, the instruction window queue is to communicate a physical register identifier to the register file, and
   wherein, in response to the communication, the register file is to decrement the count stored in the identifier physical register.

8. A register allocation unit, comprising:
   a value cache having a hit/miss output and a register ID output,
   a free list having an empty indicator output and a register ID output,
   an instruction window queue having a register ID output,
   a first selector coupled to the register ID outputs of the free list and the instruction window queue, the first selector having a control input coupled to the empty indicator output, and
   a second selector coupled to the register ID output of the value cache and to an output of the first selector, the second selector having a control input coupled to the hit/miss output.

9. The register allocation unit of claim 8, wherein the value cache comprises:
   an input for a new value signal,
   a plurality of cache entries, each to store values in association with a physical register ID, value portions of the cache entries including content addressable logic, and
   a controller, responsive to a match identified by the content addressable logic, to generate a HIT signal on the hit/miss output.

10. The register allocation unit of claim 8, further comprising a register file having an addressing input coupled to the selector output.

11. The register allocation unit of claim 10, wherein the register file comprises a plurality of register, each register having a first portion to store data and a second portion to store a counter.

12. The register allocation unit of claim 8, further comprising a register file having an addressing input coupled to the free list.

13. The register allocation unit of claim 8, wherein the hit/miss output is coupled to the register file.

14. The register allocation unit of claim 8, wherein the control input of the first selector is further coupled to the hit/miss output.

15. The register allocation unit of claim 8, wherein the instruction window queue is to output the register ID of a youngest executed instruction in a processor core.

16. The register allocation unit of claim 8, wherein the instruction window queue is to output the register ID of a youngest oldest allocated register in a processor core.

17. A method of allocating register in a processor core, comprising,
- when results from a newly executed instruction are received:
  - determining whether the results match a value already stored in the core,
  - on a match, assigning the instructions results to a register that stores the matching value, and
  - when there is no match:
    - determining whether any registers are available to store the results, and
    - when no registers are available, storing the results in a register associated with a second instruction.

18. The method of claim 17, wherein the second instruction is a youngest instruction in the core.

19. The method of claim 17, wherein the register is a youngest oldest allocated register in the core.

20. A method of allocating register in a processor core, comprising, when results from a newly executed instruction are received:
- determining whether the results match a value already stored in the core, and
- on a match, assigning the instructions results to a register that stores the matching value, wherein following the assigning, a plurality of logical registers, each generated from a different instruction, are mapped to the assigned register.

21. The method of claim 20, further comprising maintaining a count of the number of different instructions that map to the assigned register.

22. The method of claim 21, further comprising incrementing the count coincident with the assigning.

23. The method of claim 21, further comprising, when an instruction retires and the retiring instruction refers to a second instruction that maps to the assigned register, determining if the retiring instruction is the only instruction to refer to the second instruction and, if so, decrementing the count.

\* \* \* \* \*